United States Patent

[11] 3,554,476

| [72] | Inventor | Robert B. Gaylor, Jr. Pittsburgh, Pa. |
|---|---|---|
| [21] | Appl. No. | 847,364 |
| [22] | Filed | Aug. 4, 1969 |
| [45] | Patented | Jan. 12, 1971 |
| [73] | Assignee | United States Steel Corporation a corporation of Delaware |

[54] TILTING MOUNT FOR WINDOW AIR CONDITIONER
4 Claims, 3 Drawing Figs.

[52] U.S. Cl. .................................................. 248/208, 248/291
[51] Int. Cl. ..................................................... A47j 5/08, F24j 1/02
[50] Field of Search ............................................ 248/14, 16, 201, 208, 209, 236, 291, 292, 311; 62/262; 108/77, 134, 135; 98/94

[56] References Cited
UNITED STATES PATENTS

| 2,889,764 | 6/1959 | McGrath et al. | 248/208X |
| 2,895,699 | 7/1959 | Lidsky | 248/208 |
| 3,273,843 | 9/1966 | Bell et al. | 248/208 |
| 3,491,549 | 1/1970 | Oglesby | 62/262 |

*Primary Examiner*—Roy D. Frazier
*Assistant Examiner*—William H. Schultz
*Attorney*—Donald S. Ferito ABSTRACT: Apparatus includes a tilting U-shape stirrup adapted to receive and support a window air conditioner. The stirrup is pivotal outside a window opening about a pair of locking bolt assemblies attached to a pair of fixed brackets mounted on the window sill. Each of the assemblies comprises a bolt with a ratchet, a pair of winged cranks having opposed radially ribbed faces, a belleville washer and tensioning nut thereon. Pawls adapted to engage the ratchets are provided on opposite sides of the stirrup. In operation, to mount an air conditioner, the stirrup is tilted upwardly from a vertical position outside the window to a substantially horizontal position generally perpendicular to the window opening. During upward movement of the stirrup, the pawls on the stirrup ride free over the ratchets. The air conditioner is installed and locked in the horizontally positioned stirrup. Then the stirrup with the air conditioner supported therein is returned to vertical position by applying sufficient downward manual pressure thereon to cause movement by engagement of the pawls with the ratchets and slippage of one winged crank against the other of each assembly.

PATENTED JAN 12 1971

INVENTOR.
ROBERT B. GAYLOR, JR.
By Donald S. Ferito
Attorney

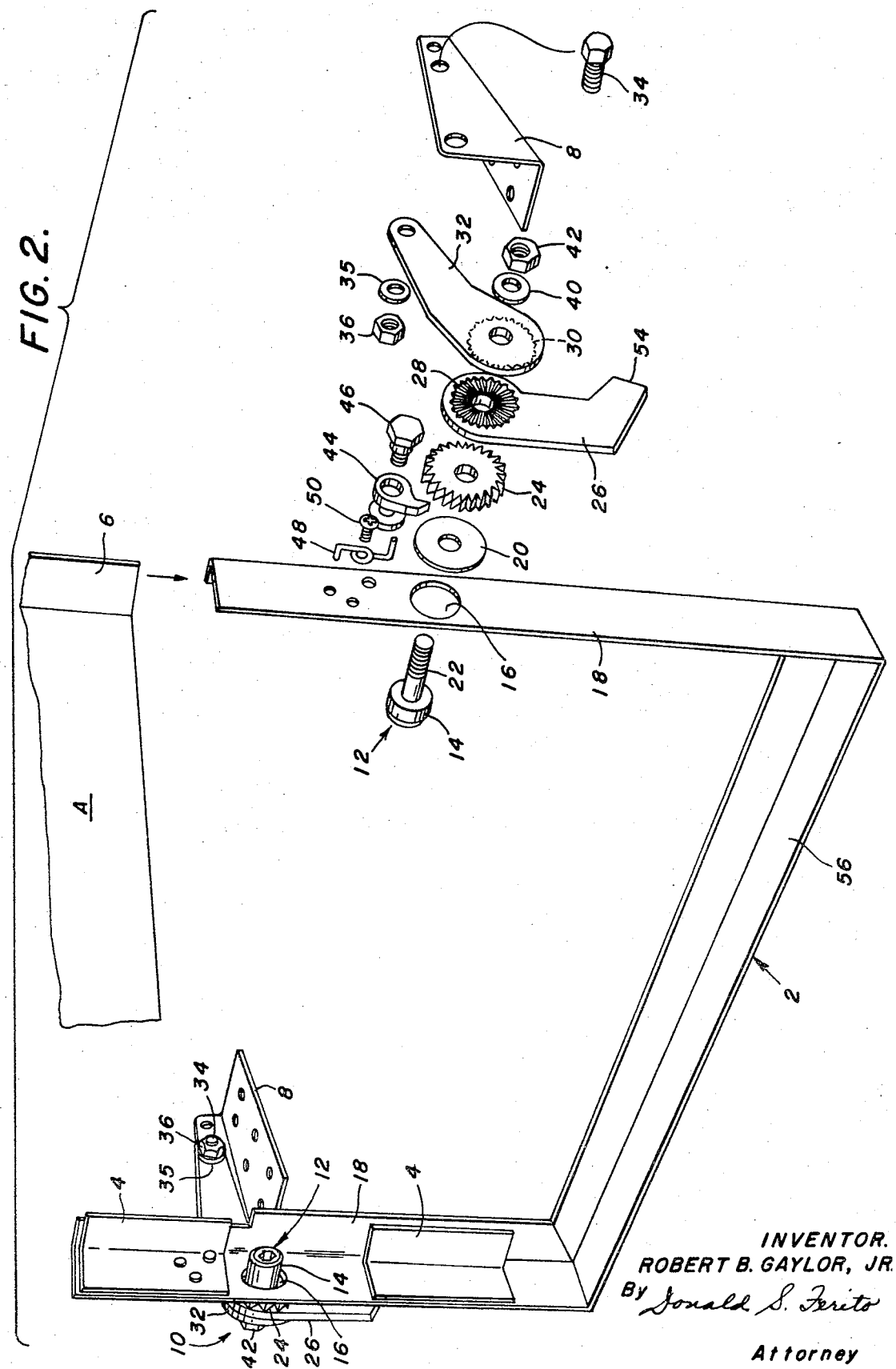

3,554,476

TILTING MOUNT FOR WINDOW AIR CONDITIONER

The present invention relates generally to the mounting of appliances such as window air conditioners and, ore particularly, has as its primary object the provision of a tilting mount for a window air conditioner which may be tilted to a substantially horizontal position on a window sill for installing an air conditioning unit therein and then be tilted to a substantially vertical position supporting the air conditioner outside of the window with the discharge duct of the air conditioner projecting into the window opening.

It is a more specific object of my invention to provide a tilting mount for a window air conditioner which includes a pair of brackets fixedly mounted on a window sill in spaced relation to each other, a rigid substantially U-shaped stirrup adapted to receive and support the air conditioner connected with the brackets for tilting movement therebetween by means of a pair of pivot bolts each of which extend slidably through one of the opposite sides of the stirrup and one of the brackets, the stirrup being rotatable about the bolts; a clutch on each of the bolts intermediate the stirrup and each bracket; means on the stirrup adjacent the clutch for selectively engaging the clutch and rotating the same when the stirrup is tilted in one direction; and securing means on the free end of each of the bolts exerting lateral compressive force urging the clutch thereon and the bracket together.

These and other objects will become more apparent after referring to the following specification and attached drawing, in which:

BRIEF DESCRIPTION OF THE DRAWING

FIG. 2 is an isometric, partly exploded, view of the tilting mount of the invention.

DESCRIPTION OF THE PREFERRED EMBODIMENT

Figure 1:
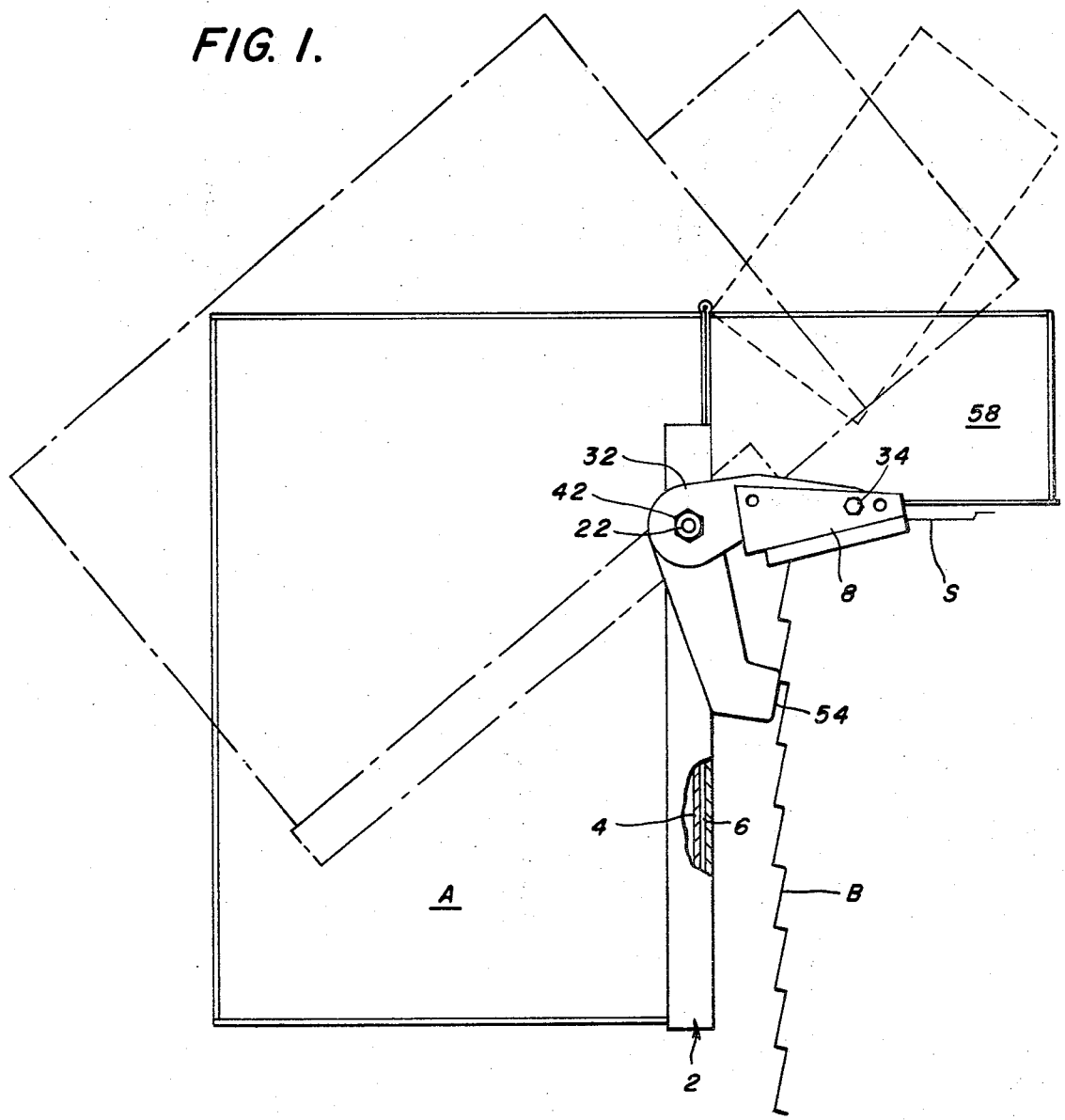
FIG. 1 is an elevational view showing a window air conditioner mounter by means of the invention.
Figure 3:
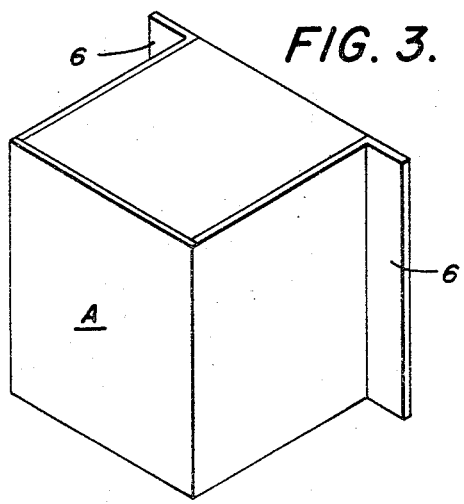
FIG. 3 is a perspective view of a typical air conditioner adapted to be mounted by the invention.

Referring more particularly to the drawing, reference numeral 2 designates generally the substantially U-shaped stirrup of the invention which is formed from angle sections having locking flanges 4 welded or otherwise fixedly attached by one edge on the inner surfaces of opposing sides 18 of the stirrup. The flanges 4 form locking channels for flanges 6 which are formed on opposite sides of an air conditioner A. The stirrup 2 is mounted on brackets 8 for tilting movement therebetween by means of a pair of pressure assemblies, designed generally by reference numeral 10.

Each of the pressure assemblies 10 includes a socket head bolt 12 disposed with its head 14 rotatably received in an oversized opening 16 in one of the sides 18 of the stirrup 2. A washer 20 having a center opening which is smaller in diameter than the opening 16 is slidably mounted on the shaft 22 of the bolt 12 adjacent the outer surface of the side 18 of the stirrup 2. A circular ratchet 24 is mounted on the shaft 22 adjacent the washer 20. A crank 26 having a radially ribbed face 28 is rotatably mounted on the shaft 22 adjacent the ratchet 24 for engagement of its face 28 with the radially ribbed surface 30 of a link 32 which is rigidly mounted on each of the brackets 8 by means of a bolt 34, lock washer 35 and nut 36. The shaft 22 of each bolt 12 extends through and is rotatable in one of the links 32.

A belleville conical disc washer 40 is fitted on the shaft 22 of each bolt 12 between the link 32 and an assembly-tensioning nut 42 threaded on the projecting end of the bolt. The nuts 42 and belleville washers 40 provide the tension necessary to hold the elements of each pressure assembly 10 together frictionally.

Pawls 44 are mounted one on each of the opposite sides 18 of the stirrup 2 by means of bolts 46 adjacent to and in engagement with the ratchets 24. Springs 48 mounted one on each side of the stirrup 2 by screws 50 urge the pawls 44 constantly into engagement with their respective ratchets.

In operation, the mount of the invention is assembled as follows:

1. A bolt 12, washer 20, ratchet 24, crank 26, link 32, belleville washer 40 and nut 42 are assembled together to form each of the two pressure assemblies 10.
2. 'The pawls 44 and pawl springs 48 are mounted on opposite sides 18 of the stirrup 2.
3. 3. mounting brackets 8 are secured to the sill S of the window opening of building B by means of screws (not shown). The distance between the brackets 8 varies in accordance with the width of the stirrup 2 which, in turn, depends on the width of the air conditioner A to be accommodated.
4. The heads 14 of the bolts 12 of the pressure assemblies 10 are inserted into the oversize holes 16 in the two opposite sides 18 of the stirrup 2; the pawls 44 are rotated to engage the ratchets 24 under the pressure of springs 48; and the link 32 of each assembly 10 is rigidly connected with a mounting bracket 8 by bolts 34, lock washers 35 and nuts 36.
5. Cranks 26 are adjusted so that the free ends 54 thereof will rest against the side of the building B, and each pressure assembly is then tightened up, by turning the bolt 12 while holding the tension nut 42, until the belleville washer exerts a predetermined amount of pressure sufficient to overcome the weight of the air conditioner to be supported by the stirrup 2.
6. The stirrup 2 is then rotated upwardly about the heads 14 of the bolts 12 until it is substantially horizontal; the air conditioner A is inserted into the substantially horizontally positioned stirrup 2 with its side flanges 6 fitted under the locking flanges 4 and its bottom resting against the cross member 56 of the stirrup.
7. The stirrup 2 and air conditioner A are then tilted downwardly as a single unit until the unit rests against the exterior of the building in substantially vertical position.
8. The hinged discharge duct 58 of the air conditioner is then manipulated to rest it on the sill S; side fillers (not shown) are installed; and the window is closed on the duct and secured in place.

It will be seen that the tilting mount of the invention operates similarly to a disc clutch with the ratchets 24 functioning as clutches and the pawls 44 functioning as clutch engaging means.

As best shown by broken lines in FIG. 1, the air conditioner A is inserted in the stirrup 2 when the stirrup is in substantially horizontal position. The stirrup 2 is maintained in horizontal position by the pawls 44 engaging the teeth of the ratchets 24. The ratchets 24 are prevented from rotating by the frictional force exerted by the tension nuts 42 and the belleville conical washers 40 on the elements of each pressure assembly between the bolt heads 14 and the tension nuts 41. The torque exerted by each of the pressure assemblies 10 is sufficient to overcome the load of the air conditioner to be installed. After the air conditioner has been installed in the stirrup 2 in horizontal position, an additional force is exerted by the installer on the stirrup and air conditioner sufficient to rotate the load stirrup downwardly until the force applied by the installer is sufficient to overcome the frictional pressure exerted by the belleville washer compression and the friction between the faces 28 and 30 of the cranks 26 and links 32, respectively. As the frictional pressure is overcome by the additional force applied by the installer, the load stirrup will rotate about the bolt heads 14 so long as the necessary additional force is applied by the installer.

In removing an air conditioner from the mount of the invention, the stirrup and air conditioner are raised to substantially horizontal position, as shown by broken lines in FIG. 1, so that the air conditioner can be slid out of the stirrup. While the loaded stirrup is being tilted upwardly, it rotates about the bolt heads 14 and since the pawls 44 are mounted on the stirrup they will ride freely over the teeth of the ratchets 24. However, being constantly urged against the ratchets by the springs 48, the pawls are always in position to engage the teeth of the ratchets to hold the stirrup and air conditioner in any position when the application of upward tilting force is stopped.

I claim:

1. A tilting mount for mounting an air conditioner on the sill of a building window which comprises a pair of spaced fixed brackets affixed to said window sill, a rigid substantially U-shape stirrup adapted to receive and support said air conditioner, means connecting said stirrup with said brackets for tilting movement therebetween outwardly of said brackets for tilting means including a pair of pivot bolts, each of said bolts extending slidably through one of each of the opposite sides of the stirrup and one of the brackets, said stirrup being rotatable about said bolts, a clutch on each of said bolts intermediate the stirrup and each bracket, means on said stirrup adjacent each clutch for selectively engaging the clutch and rotating the same when said stirrup is tilted in one direction, and securing means on the free end of each of said bolts exerting lateral compressive force urging said clutch and bracket together.

2. A tilting mount as defined by claim 1 including a washer on each of said bolts intermediate said stirrup and said clutch.

3. A tilting mount as defined by claim 1 in which each of said clutches is a ratchet wheel, and each of said clutch engaging means is a spring-loaded pawl.

4. A tilting mount as defined by claim 1 including a brake means on each of said bolts intermediate the clutch and the bracket adapted to resist rotation of the stirrup about the pivot bolts, said brake means each including a crank on the bolt, said crank having a radially ribbed lateral face surrounding the bolt at one end, and a radially ribbed face on said bracket adjacent to and normally in engagement with the radially ribbed face on the crank

UNITED STATES PATENT OFFICE
CERTIFICATE OF CORRECTION

Patent No. 3,554,476            Dated January 12, 1971

Inventor(s) Robert B. Gaylor, Jr.

It is certified that error appears in the above-identified patent and that said Letters Patent are hereby corrected as shown below:

Column 1, line 3, "ore" should read -- more --; line 33, "mounter" should read -- mounted --; line 49, "designed" should read -- designated --. Column 2, line 8, "3", second occurrence, should read -- the --; line 53, "41" should read -- 42 --; line 60, "load" should read -- loaded --; line 60, after "downwardly" insert -- . Normally the pawls 44 are engaged in the teeth of the ratchets 24 making it impossible to rotate the loaded stirrup downwardly --; line 65, "load" should read -- loaded --. Column 3, lines 10 and 11, "brackets for tilting" should read -- window, said --.

Signed and sealed this 15th day of June 1971.

(SEAL)
Attest:

EDWARD M. FLETCHER, JR.            WILLIAM E. SCHUYLER, JR.
Attesting Officer            Commissioner of Patents